United States Patent Office.

ALEXANDER MITSCHERLICH, OF MÜNDEN, GERMANY.

MANUFACTURE OF TANNIC ACID.

SPECIFICATION forming part of Letters Patent No. 263,797, dated September 5, 1882.

Application filed September 22, 1881. (No specimens.) Patented in Germany January 23, 1878, No. 4,179, and in Italy July 15, 1882.

*To all whom it may concern:*

Be it known that I, ALEXANDER MITSCHERLICH, residing at the city of Münden, German Empire, have invented Improvements in the Manufacture of Tannic Acid, of which the following is a specification.

This invention relates to the manufacture of tannic acid from wood or other vegetable matter, in connection with certain by-products, such as bisulphite of lime, adhesive substances, acetic acid, and cellulose; and the invention consists essentially in treating wood or other vegetable material, first with steam and then with bisulphite of lime at a temperature above the boiling-point of water, so that the tannic acid and other products are extracted and produced in the manner hereinafter set forth.

My improved process will be described mainly as it relates to wood, though I desire it to be understood that any other vegetable matter may be treated and utilized in a similar manner.

The aqueous solution of bisulphite of lime, which forms an essential requisite in my improved process, is obtained by exposing small pieces of carbonate of lime in a high tower or shaft simultaneously to the action of the spray of water from above and to a current of sulphurous acid from below, which latter is obtained by the burning of sulphur or of sulphurous ores. The bisulphite of lime may, however, to a great extent, be also obtained as a by-product in the manufacture of tannic acid, as will be hereinafter described, and then be used directly in my improved process. Other sulphites besides the bisulphite of lime—such as sulphite of soda, &c.—may be produced in similar manner and also utilized in my improved process.

In carrying out my invention the wood is freed of bark and cut into pieces of convenient size for handling without removing the knots and small limbs. These pieces of wood are placed into a boiler which has an interior lining of stone, cement, and lead, and which is provided with heating-tubes and with other accessories required for the induction and eduction of steam, &c. As soon as the boiler is charged with wood the boiler is hermetically closed and the wood treated with steam and then with the aqueous solution of bisulphite of lime, according to the size of the wood, at a temperature of 108° centigrade for a certain length of time, preferably for somewhat more than eight hours. By the action of the steam and bisulphite of lime upon the wood all the soluble substances which surround and permeate the fibers of the wood are dissolved, while the cellulose remains as a soft mass in the liquid. The contents of the boiler are raised to the boiling-heat, which is kept for such a length of time as the vapors which are conducted off to the before-mentioned tower or shaft continue to have a strong smell of sulphurous acid. Instead of conducting the vapors into the tower or shaft, they may also be conducted to a tank containing slaked lime, (milk of lime.) A concentrated solution of bisulphite of lime is obtained in the tank, which is extensively used in the trades for preventing the formation of acetic acid in solutions while in the process of fermentation. If in place of the slaked lime carbonate of soda or other salts are placed in the tank, the different sulphites can thus be readily produced. The solution remaining in the boiler is then run off and separated from the cellulose. It contains, besides salts of lime, (sulphate of lime, &c.,) essentially tannic acid, also adhesive substances, acetic acid, and a small quantity of sulphurous acid, which latter is retained in the solution.

The solution can be utilized, first, as a new tanning material; secondly, for the manufacture of adhesive substances; and, thirdly, for the manufacture of vinegar.

When employed for the first purpose the lime is precipitated by sulphuric acid, and the remaining solution can then be used directly for the tanning of hides; or, if the solution is to be shipped, it is concentrated to a certain consistency and properly diluted preparatory to tanning. The other materials contained in the solution are without any deleterious influence upon the tanning process.

If desired, the tannic acid may be precipitated from the solution by milk of lime, and obtained, whenever required for use, from the dry precipitate by acid treatment.

Experience has demonstrated that the small quantity of sulphurous acid still contained in the solution causes an opening of the pores of the skins during the tanning process, so that the latter is accelerated, while the presence of the sulphurous acid further tends to preserve the other substances contained in the solution. The tannic acid contained in the solution has the characteristic peculiarities of tannic acid obtained from the bark of the same wood. For instance, a solution obtained from spruce changes the color of the skin just as little as the tanning material obtained from the bark of the same wood. Sometimes, however, especially when the solution is concentrated and dried, the coloring influence of the tannic acid is somewhat modified.

When the solution is employed for the manufacture of adhesive substances it is concentrated, and the crystallized sulphate of lime (gypsum) separated by pouring off the remaining liquid. This liquid is of a brownish color, absorbs moisture from the air, and is capable of taking frequently the place of the common gum-arabic of commerce. The concentrated solution, as well as the powder obtained therefrom by evaporation, may be preserved for years without getting sour or moldy.

For some applications it is preferable to precipitate the lime from the solution by sulphuric acid or other means and to evaporate the sulphurous acid, or in place of the latter operation to transform the sulphurous acid by the addition of chloride of sodium (or potash) into sulphuric acid.

It may also be necessary for some purposes, before using the gummy solution thus obtained, to remove the tannic acid from the same.

Acetic acid is obtained by condensation of the vapors which are produced in the concentration of the solution. From a part of the liquid so obtained by condensation alcohol can be produced by fermentation.

The insoluble residue in the boiler consists of cellulose with the knotty parts of the wood, which knots are not changed by the boiling process while in the boiler, owing to their greater consistency. The fibers, knots, together with particles of bark, are finally removed from the boiler. The white or nearly white cellulose is obtained by the above process in considerably larger quantity than was heretofore supposed to be obtainable from the wood. For instance, from air-dried spruce over sixty-six per cent. of dry cellulose can be obtained. This cellulose may be utilized, either directly or by bleaching with chloride of lime, in the manufacture of paper, and in case of longer fibers even in the manufacture of textile fabrics.

The advantages of my process, as compared with other processes heretofore known, are that in producing the tannic-acid solution the wood is cut up but little and treated at a low temperature and pressure, so that the boiler does not suffer and is not liable to explosion. The steaming of the wood prepares it for the action of the bisulphite of lime, so that a single treatment of the wood with the latter is only necessary.

Having thus described my invention, I claim as new and desire to secure by Letters Patent—

1. The process of producing tannic acid, consisting in first subjecting wood to the action of steam under pressure and then to the action of an aqueous solution of bisulphite of lime at a temperature above the boiling-point.

2. The process herein described of producing simultaneously a tannic-acid solution and a solution of bisulphite of lime, which consists in first subjecting wood to the action of steam under pressure and then to the action of an aqueous solution of bisulphite of lime at a temperature above the boiling-point, and simultaneously exposing small pieces of carbonate of lime to the joint action of a spray of water from above and the fumes of the aforesaid solution from below.

In testimony whereof I have signed my name to this specification in the presence of two subscribing witnesses.

ALEXANDER MITSCHERLICH.

Witnesses:
CARL FEHLERT,
BERTHOLD ROI.